United States Patent
Belshan et al.

(10) Patent No.: US 9,631,739 B2
(45) Date of Patent: Apr. 25, 2017

(54) VALVE AND SEAT ASSEMBLY FOR A HIGH PRESSURE PUMP

(71) Applicant: Black Horse LLC, Houston, TX (US)

(72) Inventors: Daryl Belshan, Plainfield, IL (US); Justin McCoy, Spring, TX (US); Paul Lightfoot, Staffordshire (GB)

(73) Assignee: BLACK HORSE LLC, Houston, TX (US)

( * ) Notice: Subject to any disclaimer, the term of this patent is extended or adjusted under 35 U.S.C. 154(b) by 72 days.

(21) Appl. No.: 14/606,477

(22) Filed: Jan. 27, 2015

(65) Prior Publication Data

US 2016/0215588 A1  Jul. 28, 2016

(51) Int. Cl.

| F16K 15/00 | (2006.01) |
|---|---|
| F16K 31/12 | (2006.01) |
| F04B 1/04 | (2006.01) |
| F04B 53/10 | (2006.01) |
| F16K 1/38 | (2006.01) |
| F16K 15/02 | (2006.01) |

(52) U.S. Cl.
CPC ............ *F16K 31/12* (2013.01); *F04B 1/0456* (2013.01); *F04B 53/10* (2013.01); *F04B 53/1087* (2013.01); *F16K 1/38* (2013.01); *F16K 15/028* (2013.01); *Y10T 137/7866* (2015.04); *Y10T 137/7868* (2015.04)

(58) Field of Classification Search
CPC ......... Y10T 137/7866; Y10T 137/7867; Y10T 137/7868
See application file for complete search history.

(56) References Cited

U.S. PATENT DOCUMENTS

| 2,263,750 | A | * | 11/1941 | Willke | F16K 1/42 137/516.25 |
|---|---|---|---|---|---|
| 2,329,576 | A | * | 9/1943 | Anderson | F04B 53/1027 137/516.29 |
| 2,792,016 | A | * | 5/1957 | Shellman | F04B 53/1025 137/516.29 |
| 3,039,488 | A | * | 6/1962 | Bowerman | F04B 53/1025 137/516.29 |
| 3,202,178 | A | * | 8/1965 | Milton | F16K 1/46 137/516.29 |
| 3,324,880 | A | * | 6/1967 | Roberts | F04B 53/1025 137/516.29 |
| 3,483,885 | A | * | 12/1969 | Leathers | F16K 15/02 137/329.02 |
| 3,742,976 | A | * | 7/1973 | Bailey | F16K 1/46 137/516.11 |
| 4,076,212 | A | * | 2/1978 | Leman | F16K 1/46 137/516.29 |

(Continued)

*Primary Examiner* — R. K. Arundale
(74) *Attorney, Agent, or Firm* — Squire Patton Boggs (US) LLP

(57) ABSTRACT

An apparatus can include a housing, a plunger configured to reciprocate along an axis within the housing, and an internal fluid chamber disposed in the housing. A valve, having a valve base and a deformable seal, can also be included in the apparatus. The apparatus can further include a seat having an aperture therein. The valve is configured to move into and out of contact with the seat when the plunger reciprocates within the housing, based upon a fluid pressure in the internal flow chamber. In addition, an outer diameter of the deformable seal of the valve is less than an outer diameter of the seat.

16 Claims, 4 Drawing Sheets

(56) References Cited

U.S. PATENT DOCUMENTS

| | | | | | |
|---|---|---|---|---|---|
| 4,180,097 | A | * | 12/1979 | Sjoberg | F16K 15/06 137/516.29 |
| 4,487,222 | A | * | 12/1984 | Crawford | F16K 1/38 137/516.29 |
| 4,545,404 | A | * | 10/1985 | Redwine | F16K 1/46 137/516.29 |
| 4,860,995 | A | * | 8/1989 | Rogers | F04B 53/1027 137/516.29 |
| 4,951,707 | A | * | 8/1990 | Johnson | F04B 53/1025 137/516.29 |
| 5,062,450 | A | * | 11/1991 | Bailey | E21B 33/13 137/516.29 |
| 5,088,521 | A | * | 2/1992 | Johnson | E21B 21/01 137/516.29 |
| 5,193,577 | A | * | 3/1993 | de Koning | F04B 53/102 137/516.29 |
| 5,249,600 | A | * | 10/1993 | Blume | F04B 53/1087 137/516.29 |
| 7,591,450 | B1 | * | 9/2009 | Blume | F16K 1/34 137/516.29 |
| 7,641,175 | B1 | * | 1/2010 | Blume | F16K 1/385 137/516.29 |
| 8,317,498 | B2 | * | 11/2012 | Gambier | F04B 49/243 137/516.29 |
| 9,291,274 | B1 | * | 3/2016 | Blume | F16K 1/46 |
| 9,297,375 | B1 | * | 3/2016 | Dille | F15B 15/1433 |
| 2004/0170507 | A1 | * | 9/2004 | Vicars | F04B 53/007 417/360 |
| 2008/0279706 | A1 | * | 11/2008 | Gambier | F04B 49/243 417/455 |
| 2010/0143163 | A1 | * | 6/2010 | Patel | F04B 53/16 417/313 |
| 2010/0288959 | A1 | * | 11/2010 | Vicars | F16K 15/063 251/324 |

* cited by examiner

VALVE AND SEAT ASSEMBLY FOR A HIGH PRESSURE PUMP

BACKGROUND

Field

The present invention relates to a high pressure pump valve assembly, for use in high pressure applications such as hydraulic fracturing. In particular, the invention relates to the design and composition of intake and discharge valve assemblies.

Description of the Related Art

The use of high pressure pumps for a variety of different applications is well known in the industry. Some of the most common applications include industrial cleaning, water jet cutting, hydroforming, as well as a wide range of hydraulic applications. Because the components of these pumps are subject to high levels of pressure, they require continuous upkeep, which is both expensive and time consuming. One of the most popular applications of high pressure pumps is in hydraulic fracturing.

Given the ever increasing demand for affordable oil and natural gas, many alternatives to traditional oil drilling have developed over the years. One alternative, which has seen tremendous growth over the past decade, is hydraulic fracturing. Hydraulic fracturing is the process of drilling vertically into a targeted shell area, and then proceeding to drill horizontally across that shell. The shell formation is then fractured, generally with the use of explosives, and fracturing fluid, which is generally a mixture of water, sand or proppant, as well as other additives, is pumped into these fractures. The fracturing fluid helps to expand the initial fractures created in the shell. Once the fracturing fluid is pumped out of the wellbore, natural gas or oil begins to flow through the created cracks into the wellbore, at which point the gas or oil is extracted.

During drilling, a pressurized drilling solution, known as mud, composed of water and sand, is fed to the drill head in order to prevent the drill head from overheating and to provide proper lubrication. Another function of the mud is that it is used to help remove cuttings from the drilling wellbore. Throughout the drilling process, mud, cuttings, and the previously mentioned fracturing fluid are moved up and out of the wellbore. A high pressure hydraulic fracturing pump is used to control the discharge of these substances from the wellbore.

High pressure pumps utilize both intake and discharge valves. These valves are subjected to high pressures from both the pump itself and in certain applications fluid from a wellbore. This pressure causes the valves to have a very short life span, typically between 10 to 30 hours. As such, these valves have to frequently be replaced. Replacing these valves, however, is a cumbersome undertaking. One must first take apart the pump, in order to gain access to the valves, and then the entire valve assembly has to be removed and replaced with specialty tooling.

A typical valve assembly contains a seat and a valve. The function of the valve assembly is to allow the fluid to flow through it in one direction, and prevent the fluid from flowing through it in the opposite direction. The seat is traditionally a metal body that is pressed firmly into the fluid end housing to create a seal. Fluid enters through the first end of the seat, and then reaches the valve. Once a certain pressure differential is reached, the valve opens, a spring disposed above the valve compresses, and fluid moves past the valve. When the pressure on one side of the valve is equal to the pressure on the second side, the spring will start to close the valve. When the pressure on the top of the valve is greater than that on the bottom, the valve is pushed against the seat in order prevent the fluid from flowing in that direction. Due to the high pressures involved in this application, the valve generates high impact forces on the seat which causes both the seat and the valve to become warped and damaged within a short period of time.

The valve and the seat are deformed in such a way that they can no longer efficiently effectuate the desired flow of the fluid into and out of the pump. The high pressure causes the valve to be pushed against the seat, and in turn creates a high impact force which deforms the metal of the valve and of the seat. This causes the deformable seal of the valve to compress in such a way that is beyond its capabilities. This also has the effect of allowing the edge of the deformable seal to extend beyond the outer edge of the seat, which causes the deformable seal to crack. As the metal of the valve and seat wear down, the deformable seal is required to compress even further, which quickly escalates the rate of failure of the valve assembly. These effects are exacerbated by the fact that a grainy fluid is flowing through the intake and discharge valves and can become crushed and lodged between the surfaces.

As such, the valve and the seat need to be replaced at a high frequency. This replacement is a cumbersome, time-consuming, expensive process. The seat is pressed into the fluid end housing with sufficient force to prevent any fluid from leaking out of the pump, and to withstand high levels of pressure. Removing the seat, therefore, is a difficult undertaking. Although removing the valve is less difficult than removing the seat, many other components still need to be removed in order to get to the valve. Additionally, the seat is generally replaced every time the valve is replaced because of excessive wear on both components.

For the foregoing reasons, there is a need for a more durable valve assembly with an increased life span. Such a valve assembly needs to be better able to withstand the pressures and harshness of various applications, including hydraulic fracturing pumping.

SUMMARY

An apparatus, according to certain embodiments, comprises a housing and a plunger configured to reciprocate along an axis within the housing. An internal fluid chamber is disposed in the housing. The apparatus also comprises a valve having a valve base and a deformable seal, the valve having a first side and a second side. The apparatus further comprises a seat having a first end, a second end, and an aperture therein. The first side of the valve is configured to move into and out of contact with the second end of the seat when the plunger reciprocates within the housing, based upon a fluid pressure in the internal flow chamber. An outer diameter of the deformable seal is less than an outer diameter of the seat.

According to certain embodiments, a valve assembly for a high pressure pump may include a valve comprising a valve base and a deformable seal, the valve having a first side and a second side. The valve assembly further comprises a seat having a first end, a second end, and an aperture therein. When the valve is closed, the first side of the valve is disposed on the second end of the seat. An outer diameter of the deformable seal is smaller than an outer diameter of the second end of the seat.

According to certain embodiments, a seat for a high pressure pump comprising a seat body having a first end and a second end, the second end having an inner seat edge and an outer seat edge. The seat further comprises a sleeve disposed in the seat body, and having an aperture therein. At least one of the inner seat edge and the outer seat edge of the seat is rounded.

According to certain embodiments, a valve for a high pressure pump comprising a valve base, and a deformable seal disposed on the valve base. The deformable seal includes a first side, a second side, and a seal contact surface. The deformable seal is in contact with the valve base. A diameter of the first side of the deformable seal is less than a diameter of the second side of the deformable seal. An outside rim of the deformable seal is inwardly curved.

BRIEF DESCRIPTION OF THE DRAWINGS

For proper understanding of the invention, reference should be made to the accompanying drawings, wherein.

DETAILED DESCRIPTION

Figure 1:
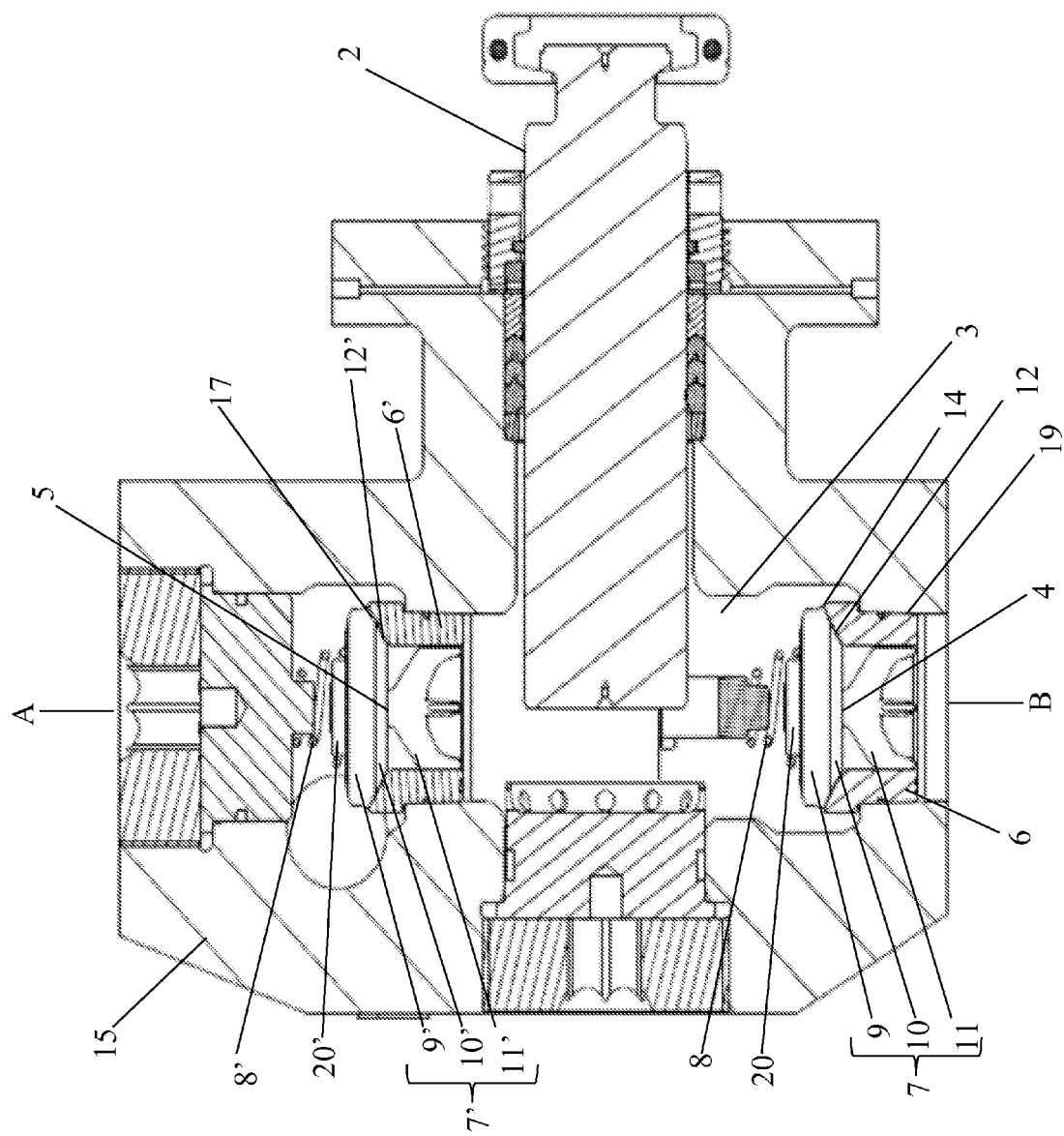
FIG. 1 illustrates a cross sectional side view of a high pressure pump according to certain embodiments.

Embodiments of the present invention relate to a high pressure pump including a fluid end housing 15. In the example shown in FIG. 1, fluid end housing 15 has a discharge end A and an intake/suction end B. A plunger 2 reciprocates axially pressurizing an internal fluid chamber 3 and enabling the positive displacement of fluid. An intake valve assembly 4 can be disposed at intake/suction end B of internal fluid chamber 3, while a discharge valve assembly 5 can be disposed at discharge end A of internal fluid chamber 3. Intake valve assembly 4 and discharge valve assembly 5 operate between an open and closed position in response to shifting differential pressures caused by the reciprocation of plunger 2.

Although certain embodiments of the fluid end of the pump, as shown in FIG. 1, have the plunger 2 reciprocating horizontally, and intake valve assembly 4 and discharge valve assembly 5 disposed vertically to one other, the present invention is not limited to such an embodiment. FIG. 1 is merely an embodiment of the invention, and as such should not be interpreted as limiting the scope of the invention.

Both normally closed intake valve assembly 4 and normally closed discharge valve assembly 5 include a seat 6 and a valve 7. When valve assemblies 4, 5 are closed, valve 7 is in contact with seat 6. In one embodiment, when plunger 2 reciprocates in a first direction, the pressure differential between internal fluid chamber 3 and the suction/intake end B is such that valve 7 opens to allow fluid to enter internal fluid chamber 3 through intake valve assembly 4. Once the pressure differential changes, valve 7 closes, and engages seat 6. When plunger 2 reciprocates in a second direction, the pressure differential between internal fluid chamber 3 and discharge end A is such that valve 7 opens to allow fluid to exit internal fluid chamber 3 through discharge valve assembly 5.

Intake valve assembly 4 can include a seat 6 and a valve 7. A spring can be used to maintain the normally closed position the valve assembly. In a normally closed intake valve assembly 4, valve 7 is in contact with seat 6 so as to seal intake valve assembly 4, and prevent any fluid from entering internal fluid chamber 3. In one embodiment, intake seat 6 includes a tapered body 19 pressed into a taper in fluid end housing 15 so as to create a seal which prevents leakage of fluid. The tapered body 19 is pressed in with sufficient force to prevent the seat from being displaced from the fluid end housing 15 as a result of high pressures. In certain embodiment, the length of the taper in the fluid end housing 15 is shorter than the length of the tapered seat body 19 so that only part of the seat is in contact with fluid end housing 15. In this embodiment, the part of the seat that is not in contact with fluid end housing 15 is disposed in internal fluid chamber 3.

In some embodiments, seat 6 includes a cylindrical body with an axial bore therein. The axial bore can extend all the way through seat 6, from a first end to a second end of seat 6. The first end of the seat can be, for example, a planar annular surface. The second end 12, hereinafter referred to as seat contact surface, of seat 6 is a frusto-conical, frusto-spherical, or tapered surface. Seat contact surface 12 is the part of seat 6 that comes into contact with valve 7 when valve 7 is closed. Further, seat 6 can have an inner diameter $D_1$ and an outer diameter $D_2$. In one embodiment, inner diameter $D_1$ can be 3.0 inches, and outer diameter $D_2$ can be 4.57 inches. To increase the surface area of seat contact surface 12, one can make inner diameter $D_1$ much smaller than outer diameter $D_2$. To further increase the surface area one can also increase a surface area of a valve contact area 10, located on a first side of valve 7. This enables the contact force, caused by the closing of valve 7, to be distributed throughout a greater surface area of seat contact surface 12 and valve contact surface 10, thus decreasing the likelihood of deformity of seat 6 and valve 7 after repeated impact loads. One example of the surface area of seat contact surface 12 and valve contact surface 10 is 5.45 and 1.92 square inches, respectively.

In certain embodiments of seat 6, the edges of seat contact surface 12 are rounded. As shown in FIG. 1, and further illustrated in FIG. 4, the seat contact surface 12 has an inner seat edge 13 and an outer seat edge 14. Both inner seat edge 13 and outer seat edge 14 can be rounded. In one example, inner seat edge 13 can have a radius of 0.118 inches, while outer seat edge 14 can have a radius of 0.063 inches. Rounding inner seat edge 13 and outer seat edge 14 helps prevent potential damage to valve 7 caused by repeated impact loads. When intake valve assembly 4 is closed, valve 7 is pushed against seat 6. If inner seat edge 13 and outer seat edge 14 are not rounded, they can deform, and even cut through, valve 7.

Seat 6 can be composed of hardened steel, such as a forged 8620H or similar material. In one example the forged 8620H is carburized and hardened to between 57 to 63 Rockwell C (HRC) to a depth of 0.047 to 0.059 inches. The seat can also be composed of other materials that provide the necessary characteristics.

Additionally, embodiments of the invention include valve 7, which can have a first side and a second side, and can include a valve base 18, a deformable seal 9, a valve contact surface 10, and a valve guide 11. In one example, valve 7 has a circular body fit to create a seal when the first side of valve 7 engages seat 6, and comes into contact with seat contact surface 12. This action seals the bore of seat 6. Once the bore is sealed, the intake valve assembly 4 is deemed closed. In the embodiment shown in FIG. 1, valve guide 11 protrudes from the first side of the intake valve, and is fully disposed inside the bore of seat 6. Once the intake valve assembly 4 opens, spring 8 compresses, and valve 7 is no longer in contact with seat contact surface 12. When the intake valve assembly 4 is closed, spring 8 decompressed, and valve 7 is pushed into seat 6, at which point valve 7 seals the bore of seat 6.

Deformable seal 9 and valve base 18 can be in direct contact with each other. In one example, deformable seal 9 is molded and bonded onto valve base 18. In some embodiments, valve guide 11 and valve base 18 are cast as one piece. Valve base 18 can be made of metal, such as cast 8630. In one example, cast 8630 is carburized and hardened to between 45-50 HRC. In one example, deformable seal 9 is composed of urethane having a hardness of Shore D 40-45. Certain other embodiments of the deformable seal 9 are composed of other materials that provide the necessary characteristics.

In one embodiment, the diameter of deformable seal 9 is smaller than outer diameter $D_2$ of seat 6. The deformable seal 9, therefore, does not extend beyond outer seat edge 14 of seat contract surface 12. By keeping deformable seal 9 within outer seat edge 14, the risk of deformable seal 9 being damaged or cut by seat 6 is minimized. In addition, this feature helps orient the flow of the fluid passing through the intake valve assembly 4, into the internal fluid chamber 3, towards discharge end A. In the embodiment shown in FIG. 1, wear and wash out on fluid end housing 15 is minimized since the flow can be directed vertically, towards discharge end A, rather than being pushed out horizontally. In some embodiments, deformable seal 9 engages seat contract surface 12, but does not make contact with outer seat edge 14. In other embodiments, valve contact surface 10 engages seat contact surface 12.

When intake valve assembly 4 is closed, both valve contact surface 10 and deformable seal 9 can engage seat contract surface 12. In the embodiment shown in FIG. 1, valve contact surface 10 is an annular upwardly inclined surface inclined at an angle $\theta_2$. In one example, valve contact surface angle $\theta_2$ is inclined at an angle of 30°. In one example, the contact area between valve contact surface 10 and seat 6 can be 1.92 square inches. Where valve contact surface 10 and seat 6 are composed of metal, and outer diameter $D_2$ of seat 6 is 4.57 inches, the metal-to-metal contact area between valve contact surface 10 and seat 6 is 1.92 square inches, which is 80% more metal-to-metal contact than is known in the prior art. In another example, the contact area between valve contact surface 10 and seat 6 can be 3.12 square inches. Where valve contact surface 10 and seat 6 are composed of metal, and outer diameter $D_2$ of seat 6 is 5.07 inches, the metal-to-metal contact area between valve contact surface 10 and seat 6 is 3.12 square inches, which is 99% more metal-to-metal contact than is known in the prior art.

Deformable seal 9 has a first side with a first diameter $D_3$, a second side with a second diameter $D_4$, and a seal contact surface 17. Seal contact surface 17 engages seat contact surface 12 when the intake valve assembly 4 is closed. In the embodiment shown in FIG. 1, seal contact surface 17 is an annular upwardly inclined surface that is inclined at a seal contact surface angle $\theta_1$. Seal contact surface angle $\theta_1$ can range between 23° to 28°. In one example, seal contact surface angle $\theta_1$ is inclined at an angle of 26.1°. In another example, seal contact surface angle $\theta_1$ is inclined at an angle of 25.1°. Such an incline is created in order to increase the contact area of deformable seal 9 that is in contact with seat contact surface 12. In an alternative embodiment, seal contact surface 17 can be downwardly declined at a certain angle. In certain other embodiments, seal contact surface 17 can be curved.

Figure 2:
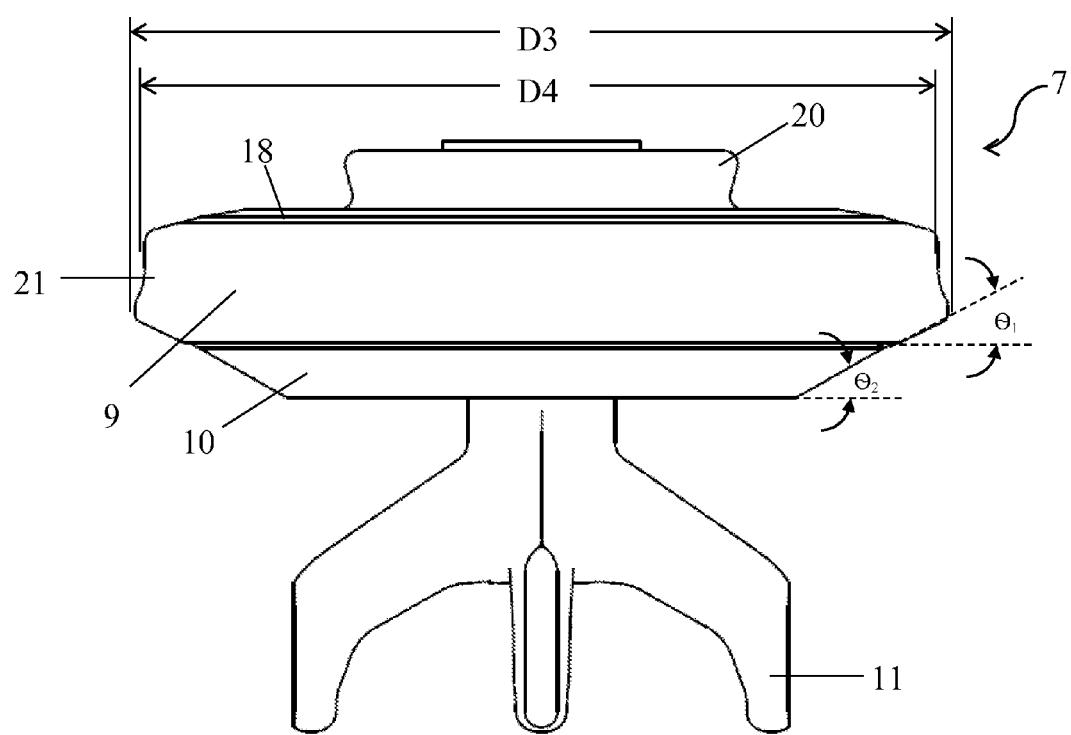
FIG. 2 illustrates a side view of a valve according to certain embodiments.

As shown in FIG. 1, and further illustrated in FIG. 2, first diameter $D_3$ is the outer diameter of deformable seal 9, while second diameter $D_4$ is an inner diameter of deformable seal 9. In certain embodiment first diameter $D_3$ is larger than second diameter $D_4$. In one example, first diameter $D_3$ is 4.842 inches and second diameter $D_4$ is 4.724 inches. In another example, first diameter $D_3$ is 4.409 inches and second diameter $D_4$ is 4.291 inches. The outside geometry of the rim 21 of seal 9 is such that the seal is inwardly curved from the first side of the seal to the second side of the seal. This outside geometry allows deformable seal 9 to flex, which enables more cycles to pass before deformable seal 9 takes a permanent set. In addition, the outside geometry, along with diameter $D_3$ being smaller than diameter $D_2$ on seat 6, helps orient the flow of the fluid passing through intake valve assembly 4, into the internal fluid chamber 3, towards discharge end A. In the embodiment shown in FIG. 1, wear and wash out on fluid end housing 15 is minimized since the flow can be directed vertically, towards discharge end A, rather than being pushed out horizontally.

Furthermore, in some embodiments, the incline of seal contact surface 17 has a mismatched angle to seat contact surface 12. This allows for a better seal and enables deformable seal 9 to clear fluid, or in some applications proppant, out of the way while valve 7 closes. While valve 7 is closing, deformable seal 9 can compress to further secure the sealing of the seat aperture. In one example, deformable seal 9 is compressed by one millimeter.

In one example, valve base 18 has a lower hardness value than seat 6 which allows for valve 7 to become more easily deformed than valve 6 due to the repeated impact loads. Therefore, seat 6 can remain installed in fluid end housing 15 while only valve 7 is replaced. This will greatly decrease the amount of time needed to service the pump. Deformable seal 9 can also have a lower hardness value than seat 6, while still maintaining the necessary hardness to withstand abrasion and pitting from the fluid flowing through seat 6.

Spring 8 may be a coil spring, and can engage the second side of valve 7. In certain embodiments spring 8 engages valve boss 20. Boss 20 can be designed to a specific height in order to increase or decrease the lift of valve 7, which can affect the flow area of the valve assembly. An increase to the lift of the valve directly results in an increase to the flow area between valve 7 and seat 6. The valve assembly flow area is restricted by either the flow area between valve 7 and seat 6, or the flow area through seat 6. In one example, the restricted flow area can be 5.07 square inches, which can be as much as 5.3% to 14.5% more than other standard valves having similar diameters. In addition, increasing the flow area allows the pump to experience less of a pressure drop across intake valve assembly 4, and reduces the risk of cavitation caused by starvation of fluid flowing into the pump.

As seen in the embodiment illustrated in FIG. 1, valve 7 is normally closed. The intake valve assembly 4 can be opened as a result of the pressure differential caused by the reciprocation of plunger 2. In one example, plunger 2 moves axially, with a typical stroke being between 8 to 12 inches. When plunger 2 moves away from internal fluid chamber 3, it causes the pressure in the internal fluid chamber 3 to decrease below the pressure of the intake/suction end B. The intake/suction end B, located below the intake valve assembly 4 in the embodiment shown in FIG. 1, generally exhibits pressure levels between 40 to 80 psi. Therefore, when the plunger is moved away from internal fluid chamber 3, the pressure in internal fluid chamber 3 is lower than the pressure below intake valve assembly 4 plus the spring force, causing valve 7 to open, and allowing fluid to flow into internal fluid chamber 3. Once the pressure in internal fluid chamber 3 equalizes with that of the suction/intake end B, the spring 8 will start to close valve 7 and seal the bore of seat 6.

In certain embodiments of the invention, intake valve assembly 4 and discharge valve assembly 5 are identical to each other. Discharge valve assembly 5 can include a seat 6' and a valve 7'. Valve 7' can include a deformable seal 9', a seal contact surface 10', a valve base 18', and a valve guide 11'. In addition, seat 6' includes a seat contact surface 12'.

The difference between intake valve assembly 4 and discharge valve assembly 5, however, is the location in which they are placed in fluid end housing 15, and the effect of the pressure differential caused by plunger 2 on opening their respective valve. Discharge valve assembly 5 is placed towards discharge end A. Fluid flows from suction/intake end B into internal fluid chamber 3, and is then discharged through discharge valve assembly 5. Discharge end A, located above discharge valve assembly 5 in the embodiment shown in FIG. 1, exhibits constant high pressure. When plunger 2 axially moves towards internal fluid chamber 3, the pressure in the internal fluid chamber 3 becomes more than or equal to the pressure above discharge valve assembly 5 plus the spring force, and valve 7' will open. Once valve 7' is open, the fluid flows out of internal fluid chamber 3, through discharge valve assembly 5, and is subsequently discharged from the pump. When the pressure inside the chamber becomes less than the pressure above discharge valve assembly 5, valve 7' closes and seals the bore of seat 6'.

FIG. 2 illustrates a side view of one embodiment of valve 7. Valve guide 11 is shown as a four legged protrusion emanating from valve base 18. In certain embodiments, valve guide 11, valve base 18, and valve contact surface 10 are cast as one piece, with valve guide 11 protruding from one end of the valve base 18. When valve 7 is closed, valve guide 11 can be fully disposed within the bore of seat 6. Seal contact surface 17 and valve contact surface 10 are also shown in the embodiment of FIG. 2. Spring 8, not shown in the figure, fits over boss 20 located on second side of valve 7. In some embodiments, the valve contact surface 10 can be made larger in order to increase the contact area between seat 6 and valve 7.

Further, first diameter $D_3$ and second diameter $D_4$ are shown. First diameter $D_3$ is larger than second diameter $D_4$. The geometry of rim 21 is also clearly shown. The seal curves inwardly from the first side of the seal to the second side of the seal. Both seal contact surface angle $\theta_1$ and valve contact surface angle $\theta_2$ are also shown. In the embodiment illustrated in FIG. 1 seal contact surface angle $\theta_1$ is smaller than valve contact surface angle $\theta_2$.

Figure 3:
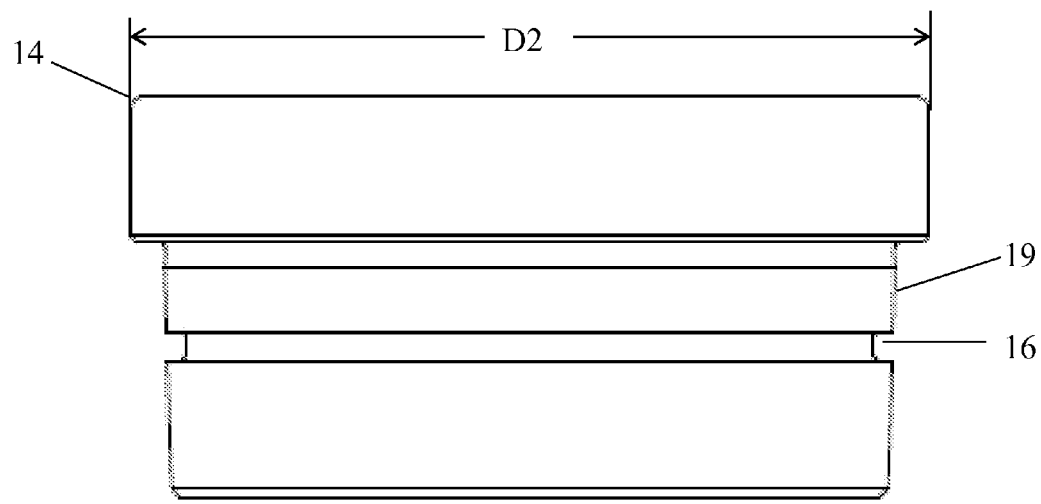
FIG. 3 illustrates a side view of a seat according to certain embodiments.

FIG. 3 illustrates a side view of one embodiment of seat 6. Outer seat edge 14 is shown as a rounded edge. In addition, a slot 16, which secures an o-ring, is shown on tapered body 19. The outer diameter $D_2$ of seat 6 is also illustrated.

Figure 4:
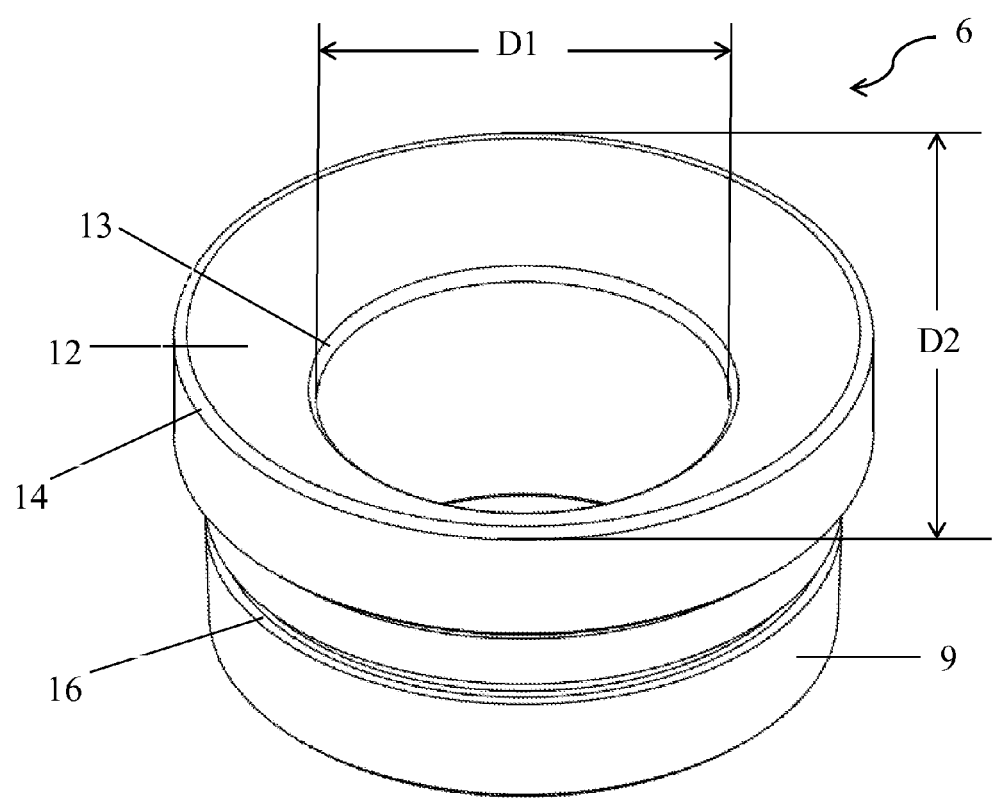
FIG. 4 illustrates a perspective view of a seat according to certain embodiments.

FIG. 4 illustrates a perspective view of seat 6. Seat contact surface 12 is shown along with inner seat edge 13 and outer seat edge 14. In this embodiment, both inner seat edge 13 and outer seat edge 14 are rounded. In addition, inner diameter $D_1$ and outer diameter $D_2$ are illustrated. Inner diameter $D_1$ does not include inner seat edge 13. Outer diameter $D_2$, on the other hand, includes both inner seat edge 13 and outer seat edge 14. In some embodiments, inner diameter $D_1$ can be made much smaller than outer diameter $D_2$. Doing so increases the surface area of seat contact surface 12, and increases the available contact area between seat 6 and valve 7.

In certain embodiments, the hardness of seat 6 can be greater than the hardness of valve 7. Because of this difference in hardness, when valve 7 and seat 6 engage each other, the harder seat will be able to withstand more impact loads from the softer valve before it deforms.

The embodiments described above help increase the longevity of both seat 6 and valve 7. By making the hardness of seat 6 greater than the hardness of seat valve 7, seat 6 will not be easily deformed. As such, seat 6 will last longer and will need to be replaced less often. Since removing seat 6 is a cumbersome undertaking, improving its longevity is advantageous. In addition, by increasing the surface area of seat contact area 12 and/or by increasing valve contact surface 10, the amount of contact area between seat 6 and valve 7 is increased. Therefore, when seat 6 and valve 7 are in contact, the resulting force is distributed across a greater surface area, thus decreasing the likelihood of deformity of seat 6 and valve 7 after repeated impact loads.

The embodiments described above also help increase the longevity of valve 7. Deformable seal diameter $D_4$ being smaller than seat outer diameter $D_2$ will help prevent deformable seal 9 from being deformed and/or cut by outer seat edge 14. Additionally, this difference in diameter allows the flow of the fluid passing through the intake valve assembly 4, into the internal fluid chamber 3, to be oriented towards discharge end A. In the embodiment shown in FIG. 1, the difference in diameter will orient the fluid in a more vertical direction instead of a horizontal direction, which decreases wear and wash out on fluid end housing 15.

The design of first end deformable seal 9 also helps to preserve valve 7. The incline angle of seal contact surface 17 is different than seat contact surface 12, which helps form a better seal when valve 7 is closed. In addition, the inwardly curved outside geometry of the rim 21 of deformable seal 9 enables the seal to flex and withstand greater impact loads before being cracked. This ultimately acts to increase the life of the deformable seal. In addition, the outer geometry of seal 9 allows the deformable seal to deform and rebound for more cycles without permanent damage.

The hardness of deformable seal 9 is another characteristic that helps improve the longevity of valve 7. By being composed of harder material, deformable seal 9 will be better equipped to withstand abrasion and pitting from the fluid. In addition, deformable seal 9, valve contact surface 10, and valve base 18 have a lower hardness than seat 6, which helps further preserve seat 6. All of the above mentioned benefits apply to both intake valve assembly 4 and discharge valve assembly 5.

The features, structures, or characteristics of certain embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising: a housing; a plunger configured to reciprocate along an axis within the housing; an internal fluid chamber disposed in the housing; a valve comprising a valve base and a deformable seal, the deformable seal comprises a first side, a second side, and a seal contact surface; and a seat having a first end, a second end, and an aperture therein, wherein the deformable seal contact surface is configured to move into and out of contact with the second end of the seat when the plunger reciprocates within the housing, based upon a fluid pressure in the internal flow chamber, wherein a diameter of the first side of the deformable seal is smaller than an outer diameter of the seat, and wherein the diameter of the first side of the deformable seal is greater than a diameter of the second side of the deformable seal, the first side of the deformable seal borders the seal contact surface, and the first side and the second side of the deformable seal are separate from the seal contact surface, and wherein an outside rim of the deformable seal is inwardly curved from the second side of the deformable seal to the first side of the deformable seal.

2. The apparatus of claim 1, further wherein a flow area in the internal fluid chamber is 5.07 square inches.

3. A valve assembly for a high pressure pump, said valve assembly comprising: a valve comprising a valve base and a deformable seal, the deformable seal comprises a first side, a second side, and a seal contact surface; and a seat having a first end, a second end, and an aperture therein, wherein when the valve is closed the seal contact surface is disposed on a contact surface of the second end of the seat, wherein a diameter of the first side of the deformable seal is smaller than an outer diameter of the seat, and wherein the diameter of the first side of the deformable seal is greater than a diameter of the second side of the deformable seal, the first side of the deformable seal borders the seal contact surface, and the first side and the second side of the deformable seal are separate from the seal contact surface, and wherein an outside rim of the deformable seal is inwardly curved from the second side of the deformable seal to the first side of the deformable seal.

4. The valve of claim 3, wherein a hardness of the valve base is less than a hardness of the seat.

5. The valve of claim 3, wherein a hardness of the deformable seal is less than a hardness of the seat.

6. The valve of claim 3, wherein a hardness of the deformable seal is 40-45 Shore D.

7. The valve of claim 3, wherein a hardness of the valve base ranges from 45-50 HRC.

8. The valve of claim 3, wherein a contacting area of the valve base and the seat is 3.12 square inches.

9. The valve of claim 3, wherein a contacting area of the valve base and the seat is 1.92 square inches.

10. The valve of claim 3, wherein the seal contact surface is an annular inclined surface from a valve guide to the first side of the deformable seal.

11. The valve of claim 3, wherein the deformable seal is placed around the valve base, and the contact surface of the deformable seal extends past the valve base.

12. The valve of claim 3, wherein an angle of the seal contact surface is different than an angle of the valve contact surface of the valve base.

13. A valve for a high pressure pump, said valve comprising:
    a valve base having a valve contact surface;
    a deformable seal disposed on the valve base, the deformable seal having a first side, a second side, and a seal contact surface, wherein the first side and the second side of the deformable seal are separate from the seal contact surface;
    wherein a diameter of the first side of the deformable seal is greater than a diameter of the second side of the deformable seal,
    wherein the first side of the deformable seal borders the seal contact surface, and
    wherein an outside rim of the deformable seal is inwardly curved from the second side of the deformable seal to the first side of the deformable seal.

14. The valve of claim 13, wherein the seal contact surface is curved.

15. The valve of claim 13, wherein the seal contact surface is angled.

16. The valve of claim 13, wherein the deformable seal is bonded to the valve base.

* * * * *